June 16, 1942.    M. SCHWARTZ ET AL    2,286,512
SYNCHRONIZER TESTER MEANS FOR CAMERAS
Filed March 21, 1939    4 Sheets-Sheet 1
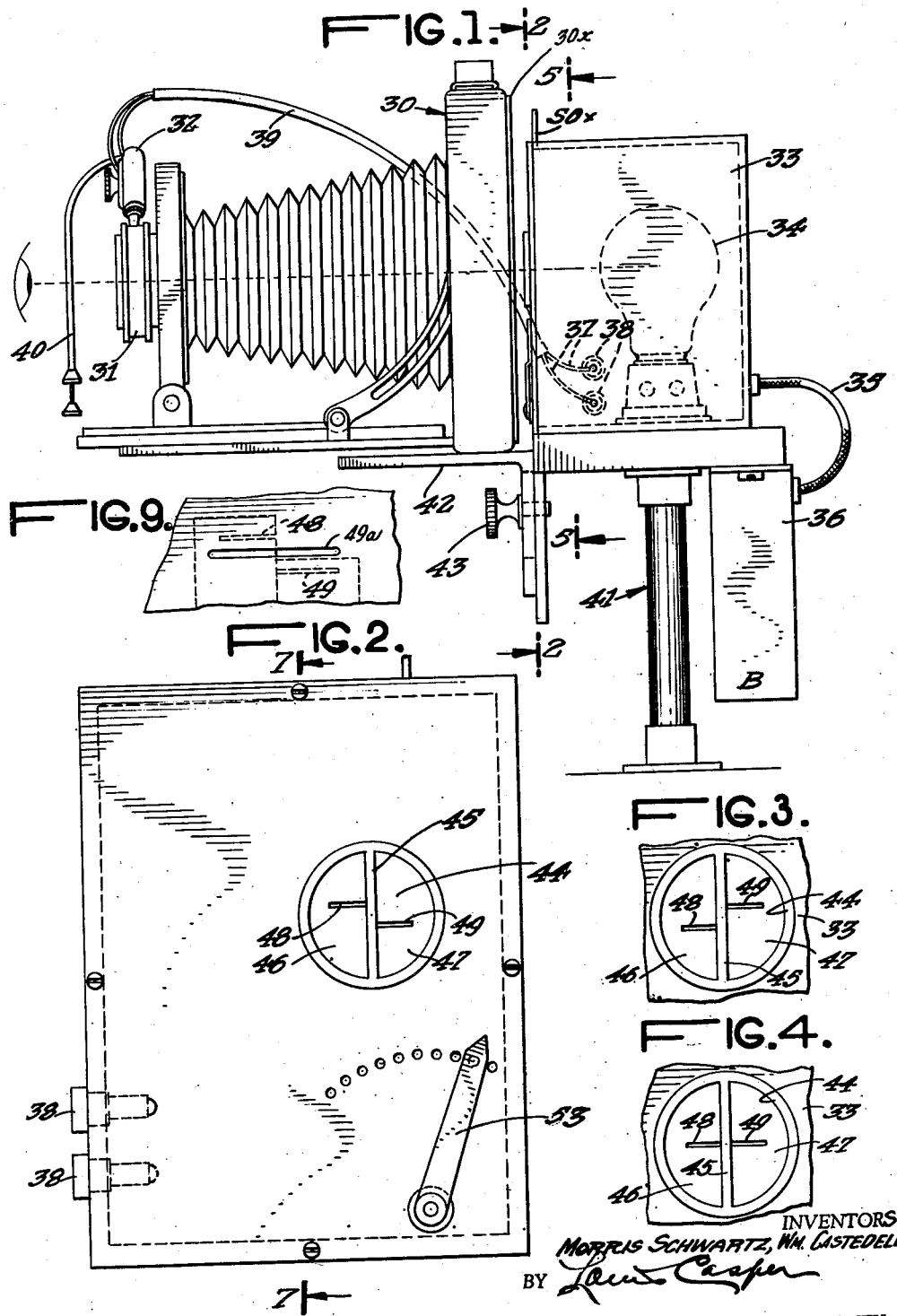
INVENTORS
MORRIS SCHWARTZ, WM. CASTEDELLO.
BY Louis Casper
ATTORNEY.

June 16, 1942.   M. SCHWARTZ ET AL   2,286,512
SYNCHRONIZER TESTER MEANS FOR CAMERAS
Filed March 21, 1939   4 Sheets-Sheet 2

INVENTORS
MORRIS SCHWARTZ, WM. CASTEDELLO.
BY Louis Casper
ATTORNEY.

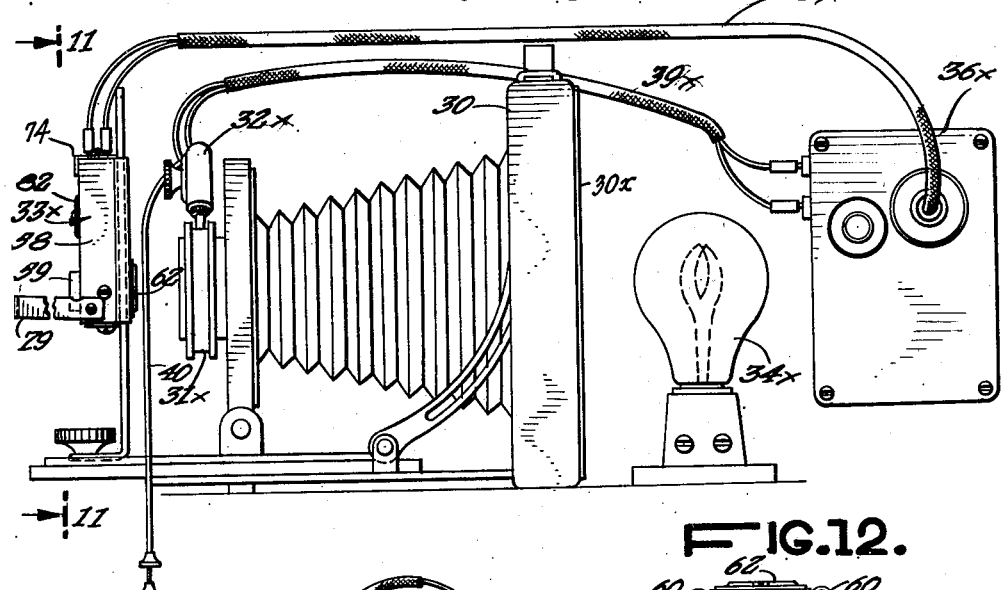
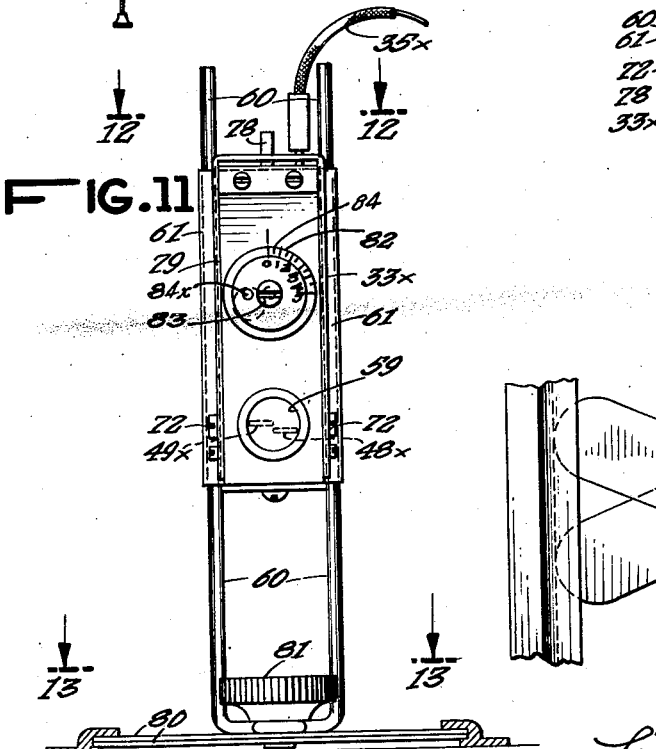
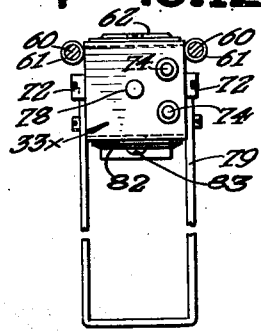
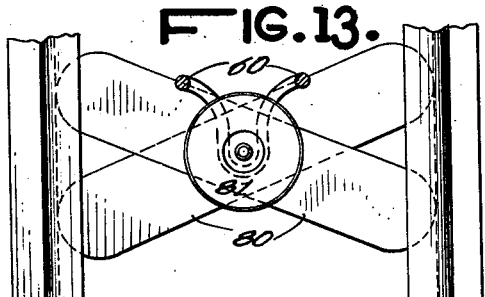

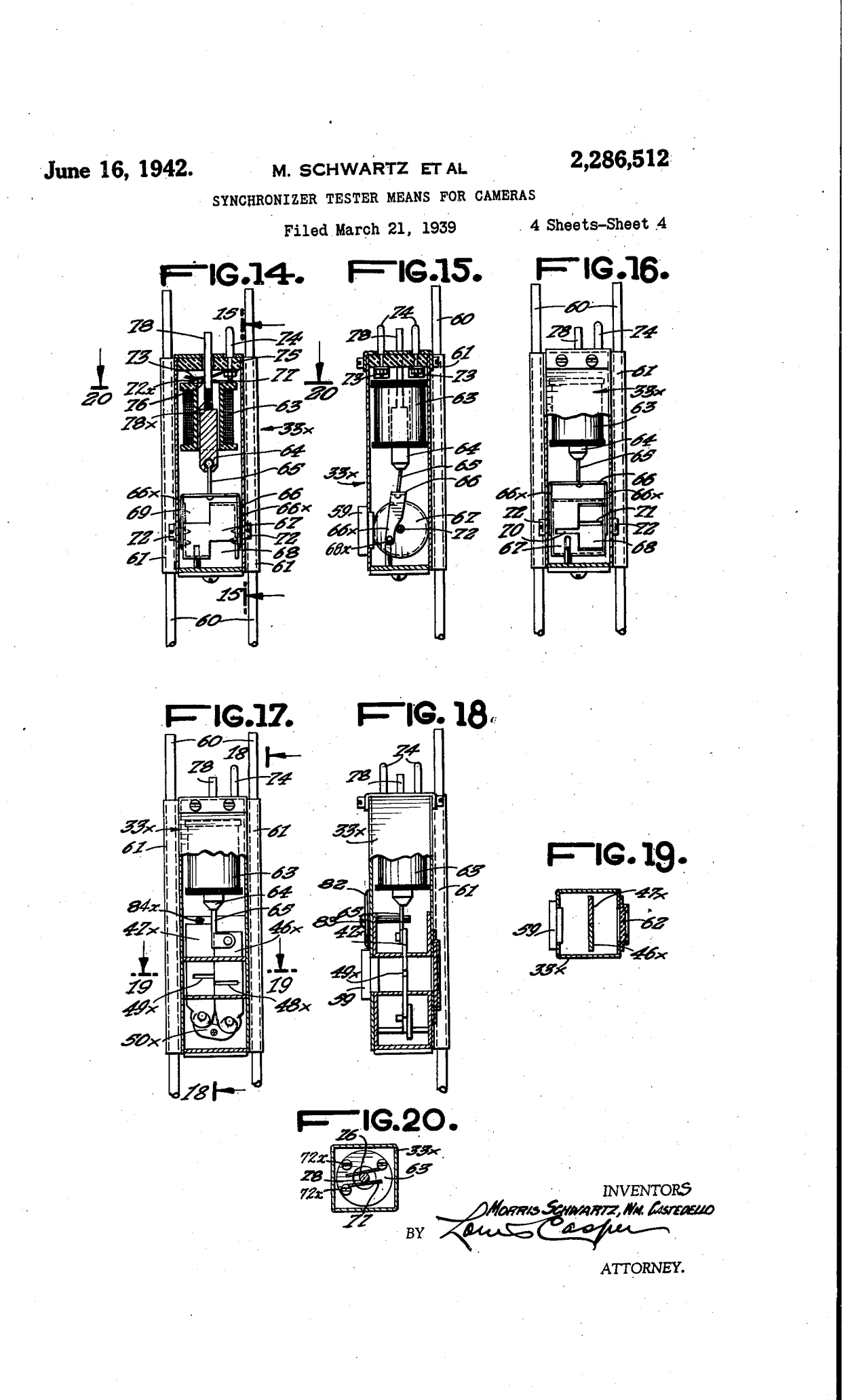

Patented June 16, 1942

2,286,512

UNITED STATES PATENT OFFICE 2,286,512

SYNCHRONIZER TESTER MEANS FOR CAMERAS

Morris Schwartz, New York, and William Castedello, Huntington, N. Y., assignors, by direct and mesne assignments, to The Kalart Company, Inc., New York, N. Y., a corporation of New York Application March 21, 1939, Serial No. 263,194

16 Claims. (Cl. 88—14)

Our invention relates to an apparatus for determining the adjustment of a photoflash synchronizing unit that is mounted on a camera; said unit being used in connection with flashlight exposures.

An object of this invention is to provide a device for determining the coincidence of the opening of a shutter of a camera with the flashing of an optimum light emission from a flashlight.

A further object of this invention is to provide a device as described which can be employed either as a stationary unit, or made applicable for portable use.

A further object of this invention is to provide an arrangement whereby a pair of movable slits through which light is projected are made operable through the medium of electro-magnet means, the movement of said slits occurring simultaneously with the tripping of the camera shutter. These slits are visible when viewed through the shutter during the opening thereof regardless of the speed of exposure.

The vertical relation or spacing of these two slits will indicate the timing of the photoflash synchronizer under test. The photoflash synchronizer is provided with a means for adjusting its action and thereby controlling the timing of the shutter in relation to the moment of maximum illumination emitted from the flash bulb.

The synchronizer is adjusted until the two slits meet as viewed through the tester at the time of the shutter's opening. The vertical separation between both slits will indicate to the viewer whether the shutter is opening early or late with regard to the peak of flash. An accurate guide for regulating the synchronizer by visible means is thereby afforded.

This invention has a coacting relation to our patent application for photographic apparatus, Serial No. 220,444 which on December 17, 1940, issued as Patent No. 2,225,596 and operates in conjunction with the same. The present invention, however, can also be used in connection with any other similar type of synchronizer unit.

In further description of our invention, attention is called to the drawings in which:

Fig. 1 is a side view showing our synchronizer testing device in connection with a camera.

Fig. 2 is a view of the synchronizer unit testing device shown in Fig. 1 taken on a line 2—2 of said figure; also showing the relation of the light projecting slits when the synchronizer unit operates in advance of the shutter movement.

Fig. 3 is a detail view showing the position of the light slits when the camera shutter operates in advance of the synchronizer unit.

Fig. 4 shows the position of the slits when the shutter and synchronizer unit are synchronized.

Fig. 9 is a sectional view showing a modification of the slit plates used in the testing device.

Fig. 10 shows a portable testing apparatus similar in function to the apparatus shown in Fig. 1.

Fig. 11 is a front view of the portable testing apparatus shown in Fig. 10, taken on the line 11—11 of Fig. 10.

Fig. 12 is a plan view of said apparatus taken on the line 12—12 of Fig. 11.

Fig. 13 is a section on a line 13—13 of Fig. 11.

Fig. 14 is a section through the mechanism of the testing apparatus shown in Fig. 10.

Fig. 15 is a section on the line 15—15 of Fig. 14.

Fig. 16 shows a further view of said apparatus as shown in Fig. 15.

Fig. 17 shows a similar apparatus using slit plates instead of a slit drum.

Fig. 18 is a section on the line 18—18 of Fig. 17.

Fig. 19 is a section on a line 19—19 of Fig. 17.

Fig. 20 is a section on a line 20—20 of Fig. 14.

Figure 5:
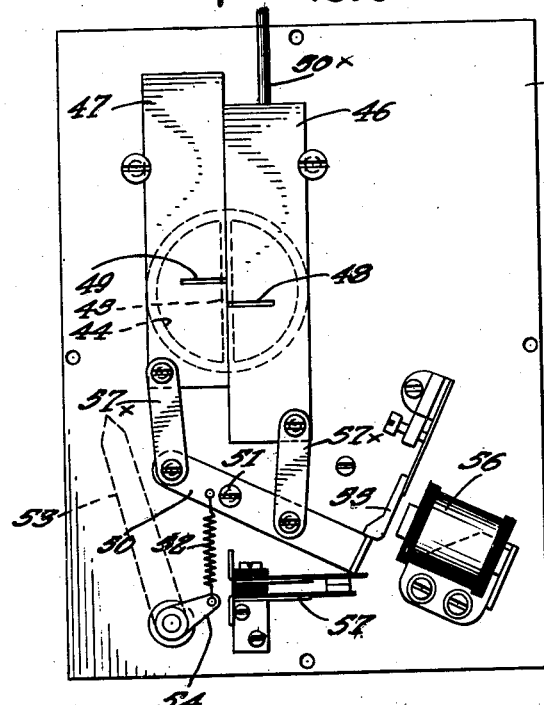
Fig. 5 is a section taken on the line 5—5 of Fig. 1 showing the mechanism for operating the slit plates.

Referring to Fig. 1, the numeral 30 designates a conventional camera. 31 is a shutter housing. 32 is a synchronizer unit similar in design to patent granted to Morris Schwartz, No. 2,117,509, May 17, 1938. The synchronizer unit is screwed into a socket (not shown) of the shutter housing 31. 33 is a box like container in which the light source is contained. The wiring 35 electrically connects the battery in the battery case 36 to the light source in box 33.

A pair of connector tips 37, is inserted into sockets 38 of the box 33. The tips 37 are connected with the wiring 39 which extends into the synchronizer unit 32. The synchronizer unit 32 is operated through the medium of the cable release 40. The box 33 is attached to a standard 41. An adjustably mounted base plate 42 is also mounted on said standard 41 and which can be adjusted vertically through the medium of a thumb screw 43. The box 33 has a circular opening 44. A partition bar 45 divides the opening 44 into two equal parts.

A pair of plates 46 and 47 (see Fig. 5) are located in the rear of the opening 44. The plate 46 has a narrow slit 48 and the plate 47 also has a narrow slit 49. The plates 46 and 47 are hingably connected to an arm member 50 through the medium of auxiliary arm members 57X.

The arm member 50 hinges at the pivot screw 51 and is held under tension of a spring 52. The tension of said spring 52 can be adjusted by means of a manually operated arm 53 acting on said spring through the medium of the spring connected arm 54. Said adjustment of the spring 52 by means of the arm 53 enables the operator of the testing apparatus to adjust the retractive speed of the member 50 after the release thereof by the armature 55 of the electromagnet 56. Said spring adjustment is made in accordance with the time-speed of the particular type of flashlamp to which the synchronizer unit and camera shutter are to be adapted.

The arm member 50 is restrained from operating by means of a restraining finger armature 55.

A magnet 56 when energized actuates and attracts towards it the restraining finger armature 55, and thus releases the hingably mounted arm member 50. The release of said member 50 causes said member to swing upwardly under the impulse of the spring 52, and finally causes said member to settle down to the position shown in Fig. 6.

Figure 6:
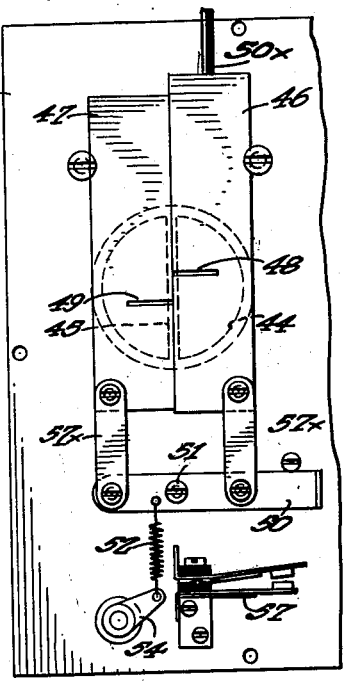
Fig. 6 shows the position of the slit plates when in operation.
Figure 7:
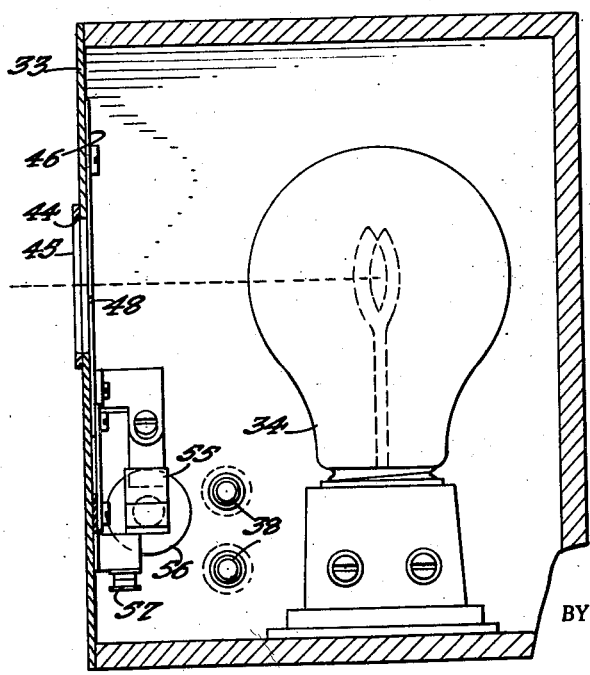
Fig. 7 is a section on the line 7—7 of Fig. 2 showing the light source for said slits.

A pair of contact springs 57 which are normally closed will open when the hingably mounted arm member 50 is released (see Fig. 6). The contact springs 57 are electrically connected to the battery 36. The opening of said contacts will break said electrical connection and will disconnect the flow of current from said battery 36. To return the hingably mounted arm 50 to its original position shown in Fig. 5, the bar 50x is depressed downwardly. The aforesaid movement will close the contact switch 57. The switch 57 serves the function of a "safety switch" in avoiding a short circuit of the battery 36. Immediately upon the closing of the contacts in the synchronizer unit 32, consequent to the set-off thereof, the magnet 56 attracts the armature 55 which action opens the contact switch as shown in Fig. 6. In this manner the circuit 39 is opened, and, in the event of a short circuit of the contacting arrangement in the synchronizer unit aforesaid, a short circuit of the battery 36 is thus prevented.

*Operation*

When photographing pictures with a camera equipped with a synchronizer unit, it is very important that there should be but a negligible lapse of time between the tripping of the shutter and the functioning of the synchronizer unit, since a few thousandths of a second may mean the difference between the success and failure of a picture exposure. The reduction or practical elimination of the time variation referred to is made possible by the novel testing device comprising the present invention. The device aforesaid checks the adjustment of the synchronizer unit and enables the operator to bring said unit into correct timing relation with the tripping of the camera shutter: for instance, to adjust the synchronizer unit so that the midpoint of the shutter opening period will occur approximately .22 sec. after the time that the circuit is closed through the flash lamp. It is obvious that it is necessary to change the adjustments of the synchronizer unit on a particular camera to conform to the movement of the shutter aforesaid. The arrangement and adjustment referred to result in a maximum percentage of successful pictures.

The usual tests of the synchronizer unit in connection with a camera shutter are made through the medium of a circuit including said synchronizer unit, a flashlight and a battery. The flashlight will flash at the time set through the adjustment of the synchronizer as stated.

Since it is necessary to obtain coordination of the functioning of a synchronizer unit with that of its companion shutter operating in connection therewith, in order to obtain perfect picture exposures, it is essential to provide testing means to accomplish the aforesaid result. Tests involving the use of flashlights to obtain correct relation for the timing of said synchronizer unit and the camera shutter are obviously expensive.

In the utilization of our invention, the need for a flashlight bulb is eliminated by the utilization of the apparatus comprising the tester arrangement including the lamp bulb 34 shown in Fig. 1 which is located inside the box 33; also the lamp 34x shown in Fig. 10, the latter arrangement being a modification of that shown in Fig. 1 and which is the preferred embodiment of our invention.

The light from the light source 34 passes through the slits 48 and 49 (Figs. 3 and 4) and also through the objective lens and shutter housing 31 shown in Fig. 1; and likewise in Fig. 10, the light from the light source 34x passes through the camera 30 and through the camera objective 31x, and is observed through the aperture 59 of the tester unit 33x.

The operator in testing a synchronizer unit scans through the camera objective 31 as shown in Fig. 1, or through the aperture 59 as shown in Fig. 10.

Since the plates 46 and 47 move upon the functioning of the arm member 50 when the magnet 56 is energized, the slits 48 and 49 will move reciprocally relative to each other; the plate 46 moving upward as the plate 47 moves downward. The slits 48 and 49 will be in coincidence with each other as shown in Fig. 4 if the camera shutter of the objective 31 and the synchronizer unit 32 are in operative synchronous relation with each other.

If the synchronizer unit 32 lags behind the shutter movement, the position of the slits 48 and 49 will appear as shown in Fig. 2, and when said synchronizer unit operates in advance of the movement of the camera shutter, the positions of the slits appear as shown in Fig. 3.

Referring to Fig. 9, which is a modification of the slit arrangement shown in Figs. 2, 3 and 4. The slits 48 and 49 are viewed through the horizontal aperture 49a, and when said slits are in horizontal coincidence with respect to each other, a continuous line of light from the light source 34 is observed along the entire horizontal length of the aperture 49a.

Referring to Fig. 10. In said figure there is shown an arrangement whereby the synchronizer unit 32x can be synchronized with the camera shutter 31x through the medium of the portable testing unit 33x. The unit 33x comprises a rectangular container 58 having a viewing opening 59.

The container 58 is supported on a pair of legs 60, said legs 60 being inserted into tubular members 61 in such a manner that the container 58 can be slid up or down on the legs 60, and in this manner enabling the proper leveling of the opening 59 with that of the camera shutter 31x. The slits 48x and 49x are observable through the opening 59 as shown in Fig. 11.

The rear portion of the container 58 has a rectangular opening 62 through which the light from the light source 34x projects through the slits 48x and 49x upon the momentary opening of the camera shutter. Inside the container 58 there is provided a solenoid magnet 63, said magnet having a plunger armature 64. Said armature 64 is secured to a flexible connecting arm 65 which in turn is fastened to a U-shaped member 66. A drum 67 which has cut out portions 68 and 69, and also slits 70 and 71 is rotatably mounted on a pair of trunnion screws 72. The extending portions 66x of the U-shaped member 66 are secured to the drum 67 at 68x. The wiring of the solenoid magnet 63 is held in position by screws 72x. Contact plates 73 which contact with the screws 72x are attached to prongs 74 which are held by a Bakelite plate 75.

A pair of contact springs 76 and 77 are also held on the Bakelite plate 75.

The springs 76 and 77 contact with the pin 78. The lower part 78x of the pin 78 is insulated and when the solenoid plunger armature 64 is moved upward, said movement pushes the pin 78 in such a manner so that the insulated portion 78x will be located between the springs 76 and 77, thus breaking the flow of the current, said disconnection preventing the unrequired use of the battery. To restore the electric connection the pin 78 is pushed downward.

When the solenoid plunger 64 is in normal position as shown in Fig. 14, the spring contacts 76 and 77 contact with the slidably mounted bar 78, thus completing an electrical circuit. The aforesaid circuit is broken when the solenoid 63 is energized as the plunger armature 64 will then move upward thereby separating the spring contacts 76 and 77 through the medium of the insulated portion of the bar 78.

Figure 8:
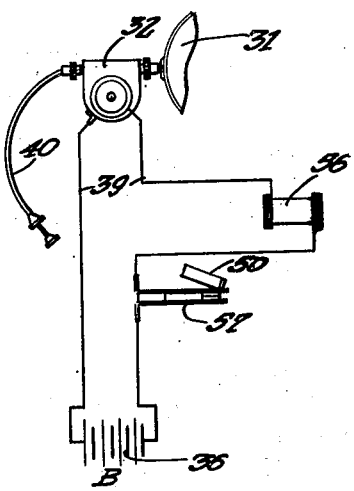
Fig. 8 is a circuit diagram, said circuit being used in connection with said testing device.

Referring again to Fig. 10. When checking the synchronization of the synchronizer unit 32x and the camera shutter 31x, a light source 34x is placed in the rear of the camera ground glass. In Fig. 1 and similarly in Fig. 10, the light from the light source 34 (Fig. 1), and the light source 34x (Fig. 10) passes through said ground glass 30x. In Fig. 10 the connectors 74 are electrically connected to a battery case 36x through the medium of the wiring 35x. The circuit arrangement of the wiring as described is shown in Fig. 8.

In the case of the testing device 33x, the slits 70, 71 are located on the drum instead of on flat plates as shown in Fig. 5, but the result of the test is similar to that obtained with the device shown in Fig. 1. In other words, if the synchronizer unit 32x and the camera shutter 31x operate in unison, at the time of the optimum opening of the camera shutter 31x, the slits 70, 71 will be on a straight line with respect to the observer viewing said slits through the opening 59 of the testing device 33x.

To facilitate the observation of the position of the slits, a U-shaped bar 79 is provided for sighting. The drum 67 is rotated around the trunnion pins 72 when the solenoid magnet 63 is energized.

To close the circuit for operating the magnet 63, the operator depresses the bar 78 thus restoring the electrical connection of the contact springs 76 and 77 (Fig. 20).

In Figs. 17, 18 and 19 there is shown a testing device similar to that shown in Fig. 14, with the difference, however, that, instead of a drum 67 being employed, slidably mounted plates 46x and 47x are used in a manner similar to that shown in Fig. 5.

Plates 46x and 47x have slits 48x and 49x, and said plates are balanced on a hingably mounted bar 50x.

When the plate 46x is moved upwards through the medium of the solenoid plunger armature 64, the plate 47x will move downward due to the action of the pivoted member 50x.

The operation of this apparatus is similar to that shown in Fig. 14, but in this case, however, no sighting bar is needed, since the slits are on a horizontal plane whereas in the device shown in Fig. 14 the slits are located one back of the other. To facilitate the affixing of the testing apparatus in front of the camera shutter, a pair of flat hingably mounted plates 80 (Fig. 13) are secured to the bottom of the legs 60 through the medium of the milled knob 81.

The plates aforesaid can be adjusted to fit the base plate of any camera.

Referring to Fig. 11. For the purpose of adjusting the position of the slits 48x and 49x of the testing device 33x, a dial 82 is rotatably mounted on a screw 83. Markings 84 with designations from "0" to "5" are affixed in said dial 82. A pin 84x is fastened to the dial 82. Said pin 84x contacts with the slidably mounted plate 47x (see Fig. 17).

When the position of the slits 48x and 49x is required to be adjusted, the dial 82 is rotated manually.

The apparatus herein described and embodying our invention which we have termed a "Synchroscope" is of preferably small dimensions and is electrically operated through the medium of the circuit including the synchronizer unit as shown in Fig. 8. The apparatus aforesaid gives a visual indication of the shutter timing in relation to flash peak intensity. The aforesaid function is accomplished without the need for a flash bulb or other facility or material.

The dial arrangement as shown in Fig. 11 is provided for different time lag intervals associated with the various flash bulbs now on the market.

As shown in Figs. 11 and 13 the testing device is fastened in front of the camera lens and shutter to be tested by sliding the adjustable crossed bars 80 in the camera track. The viewing window is raised or lowered in height to center with the lens. Electrical connection is established with the battery by means of the electrical cord connection as shown in Fig. 10. The small plunger projecting through the top of the testing device is gently pushed down, the synchronizer unit attached to the battery is wound and the shutter cocked. The shutter can be set for a speed of 1/200 sec., or the maximum shutter speed as desired. The back of the camera is then opened and exposed to a strong light such as daylight, or an electric lamp such as the lamp 34x, Fig. 10.

Gazing directly into the front window of the testing device, the synchronizer is released in the usual way by pressing the cable release and then noting the position of the two slits. The synchronizer unit is correctly adjusted if the two slits 48x and 49x are seen end to end as one line.

If the left slit is somewhat higher than the slit to the right as shown in Fig. 11, the shutter is opening too early. The synchronizer unit is therefore adjusted by decreasing the spring tension behind the plunger a point or two. The test is then repeated until the desired position of the two slits is attained. If the position of the two slits is otherwise than as stated, that is, the right slit is lower, the latter position will indicate that the shutter is somewhat late in opening and the synchronizer unit can then be adjusted to advance the shutter action by turning the milled tension knob of said synchronizer unit up a point or two.

When the two slits are lined up end to end with no appreciable vertical separation, the synchronizer unit is correctly adjusted for the particular shutter on the camera, and may be used with the flash bulb for which the dial adjustment on the testing device has been set. When changing over to another type of lamp, which is either later or earlier in time lag, the dial 82 is set correspondingly.

In the foregoing description of our invention, it will be seen that our invention is capable of considerable variation without departing from the spirit of said invention.

What we claim is:

1. In an apparatus for determining the synchronization of the optimum opening of a camera shutter with the peak intensity illumination of a photoflash bulb, said synchronization being obtained through the adjustment of a synchronizer unit associated with the objective including said camera shutter for tripping the shutter, said apparatus including a tester unit mounted in line with the axis of the lens of said camera objective, said apparatus having a light source in connection therewith, a pair of members mounted for movement in opposite directions in said tester unit, a slit in each of said members through which the light from said light source may project, an electro-magnetic device for controlling the operation of said slidable members, a circuit including said electro-magnetic device, a battery and said synchronizer unit, said electro-magnetic device made operable through the medium of switch releasing means in said synchronizer unit; and the position of said sliding members and the slits therein on the opening of said camera shutter by the operation of said synchronizer unit determining the time of the opening of said shutter relative to the operation of the switch release of said synchronizer unit whereby to enable the adjustment of said synchronizer unit.

2. In apparatus of the class described, said apparatus including a camera, a synchronizer unit for synchronizing the ignition of a photoflash bulb with the tripping of the camera shutter associated with the objective of said camera, a tester unit and a light source mounted in line with the lens of said camera, a pair of slidable members movable in opposite directions in said tester unit, slits in said slidable members through which the light from said light source may project, an electro-magnet in said tester unit with an armature in latching relation with a pivoted arm member linked to said slidable members, adjustable spring means attached to said pivoted arm member for moving the same in one direction, the adjustment of said spring means determining the rate of movement of said arm member thereby so that said slidable members move from a normal latched position to a position with the slits therein opposite one another in a time interval corresponding to the rate of speed of a photoflash bulb when ignited by said synchronizer unit, said electro-magnet, a battery, and said synchronizer unit included in a circuit in said apparatus, the set-off of a switch in said synchronizer unit causing the energization of said magnet and the consequent movement of the armature thereof, said armature movement causing the release of said pivoted arm member for movement by said adjustable spring means to thereby cause movement in opposite directions of said slidable members whereby the position of said slits at the time of the full opening of said camera shutter as viewed therethrough indicates the time relation of said shutter opening operation and the photoflash bulb igniting operation of said synchronizer unit.

3. In an apparatus for determining the synchronization of the optimum opening of a camera shutter with the peak intensity illumination of a photoflash bulb, said synchronization being obtained through the adjustment of a synchronizer unit associated with the objective of said camera, said apparatus including a tester unit and a light source, said tester unit being positioned in line with the axis of the lens of the camera under test, a pair of slidable members movable in opposite directions relative to each other in said tester unit, slits in said slidable members through which the light from said light source may project, an electric circuit included in said apparatus, said circuit including a switch in said synchronizer unit, an electro-magnetic device and a source of potential, and means including said electro-magnetic device whereby said slidable members are made primarily operable through the set-off of the releasing means of said synchronizer unit so that the position of said slits at the time of the optimum opening of said camera shutter indicates the adjustment of said synchronizer unit.

4. In an apparatus for determining the synchronization of the optimum opening of a camera shutter with the peak intensity illumination of a photoflash bulb, said synchronization obtained through the adjustment of a synchronizer unit attached to said camera shutter, said apparatus including a light source and a testing unit and means for mounting said testing unit and said light source in line with the central axis of a lens in the camera shutter, a pair of members mounted for sliding movement in opposite directions in said testing unit, an electro-magnetic device in said testing unit controlling the movement of said members, slits in said slidable members through which the light from said light source may project, said electro-magnetic device, a battery and a switch in said synchronizer unit included in a circuit in said apparatus, means operated by the set-off of said switch in said synchronizer unit and the tripping of said camera shutter thereby to cause the closing of said circuit and the consequent energization of said electro-magnetic device to effect movement of said slidable members whereby the relative positions of the slits in said slidable members determine the synchronization of the opening of said camera shutter and the set-off of said switch in said synchronizer unit.

5. In apparatus for determining the synchronization of the optimum opening of a camera shutter with the peak intensity illumination of a photoflash bulb, said synchronization being obtained through the adjustment of a synchronizer unit associated with the objective having the camera shutter contained therein, said apparatus including a tester unit and a light source, a pair of slidable members mounted for sliding movement in opposite directions in said tester unit, a slit in each of said members through which the light from said light source projects, said slidable members made operable through the medium of electro-magnetic means in said tester unit, said electro-magnetic means, a source of potential and said synchronizer unit included in a circuit in said apparatus; means operated by the set-off of said synchronizer unit for causing the momentary closing of said circuit and the consequent energization of said electro-magnetic means to thereby cause the movement of said slidable members; the position of said slits at the time of opening of said shutter indicating the time relation of said shutter opening and the photoflash bulb igniting operation of said synchronizer unit, whereby said synchronizer unit may be adjusted until said slits in said slidable members are in line with each other, and manual resetting means in said tester unit for resetting the same preparatory to the next following set-off test of the synchronizer unit aforesaid.

6. The structure as set forth in claim 4, wherein said mounting means includes an adjustable support for said testing unit, said support adjustably mountable on the carriage of the camera, said tester unit vertically slidable in said support whereby an aperture in said tester unit may be moved into sighting coincidence with the camera objective thereby enabling the sighting of said slits which are illuminated by said light source during the opening period of the shutter aforesaid.

7. In apparatus for determining the synchronization of the optimum opening of a camera shutter with the peak intensity illumination of a photoflash bulb, said synchronization being obtained through the adjustment of a synchronizer unit attached to said camera shutter; said apparatus including a tester unit adapted to be positioned in line with the axis of the lens of the shutter of the camera under test, said apparatus also having a light source included therein, said tester unit comprising a pair of slidable members movable in opposite directions relative to each other, slits in said slidable members through which the light from said light source may project, an electro-magnetic device for controlling the operation of said slidable members, circuit connections for controlling the electro-magnetic device including a power source and a switch in said synchronizer unit for controlling the energization and deenergization of the electro-magnetic device, the relative positions of said slidable members and slits therein following the operation of said switch indicating the time interval between the opening of said shutter and the release of said synchronizer unit, thereby to enable adjustment of said synchronizer unit to vary the time of the opening of said shutter relative to the time of release of said synchronizer unit.

8. The structure as set forth in claim 3, said electro-magnetic device including a solenoid magnet, a plunger armature movable in said solenoid magnet, said armature operably connected with said slidable members.

9. The structure as set forth in claim 7, and a safety contact switch included in said circuit and other means controlled by said electromagnetic device for operating said switch to open said circuit to said electromagnetic device after the energization thereof.

10. The structure as set forth in claim 4, said electro-magnetic device including an electro-magnet with an armature associated therewith, a pivoted arm member, a retractile spring attached to said arm member, said armature normally blocking movement of said arm member by said spring, said arm member having a pair of auxiliary link members pivotally attached thereto, said auxiliary link members being pivotally connected to said slidable members whereby the movement of said arm member by said spring causes the movement of said slidable members on the operation of said armature by the energization of said electro-magnet.

11. In a device of the type described for testing a synchronizer unit employed in conjunction with a camera and a photoflash bulb whereby the bulb is ignited and the camera shutter tripped in timed relation so that the shutter is at full opening during the maximum illumination, a pair of movable members with slits therein, said members being movable in opposite directions relative to one another, means for adjusting the time of movement of said members from normal positions to place the slits therein in predetermined location to correspond to the ignition-maximum illumination characteristics of various photoflash bulbs, means controlled by said synchronizer unit to initiate the movement of said movable members from said normal positions and to trip said camera shutter, a source of light in line with the central axis of said camera shutter and said movable members, means including said source of light for determining the position of the slits in said members on the full opening of said camera shutter, the said determined position of said slits relative to the said predetermined location indicating the relative time of the shutter tripping and photoflash bulb igniting operation of said synchronizer unit whereby said synchronizer unit may be adjusted.

12. The structure as set forth in claim 11, wherein the means for adjusting the time of movement of said movable members from said normal positions to place the slits therein in predetermined locations includes means for changing the normal positions of said movable members.

13. The structure as set forth in claim 11 and electromagnetic means, means controlled by said electromagnetic means for initiating the movement of said movable members, a source of potential and a normally open primary switch operated by said synchronizer unit for closing a circuit from said source of potential to said electro-magnetic means, a normally closed secondary switch in said circuit and means operative concomitantly with the operation of said movable members for opening said secondary switch.

14. The structure as set forth in claim 11 and electromagnetic means, means controlled by said electromagnetic means for initiating the movement of said movable members, a source of potential and a normally open primary switch operated by said synchronizer unit for closing a circuit from said source of potential to said electro-magnetic means, a normally closed secondary switch in said circuit, means operative concomitantly with the operation of said movable members for opening said secondary switch, means for resetting said movable members, and means operative on the resetting operations of said movable members to said normal positions for closing said secondary switch.

15. The structure as set forth in claim 3 wherein said tester unit includes a casing enclosing said slidable members, and sighting apertures formed in opposite sides of said casing substantially opposite the slits in said movable members.

16. The structure as set forth in claim 11 and including a resilient spring means tending to move said movable members from said normal positions and means for adjusting the tension of said spring to vary the time of movement of said movable members from said normal positions to place the slits therein in predetermined locations.

MORRIS SCHWARTZ.
WILLIAM CASTEDELLO.